Sept. 4, 1934.  A. W. ZIMMERMANN  1,972,727
CULTIVATING TOOL
Filed March 2, 1933
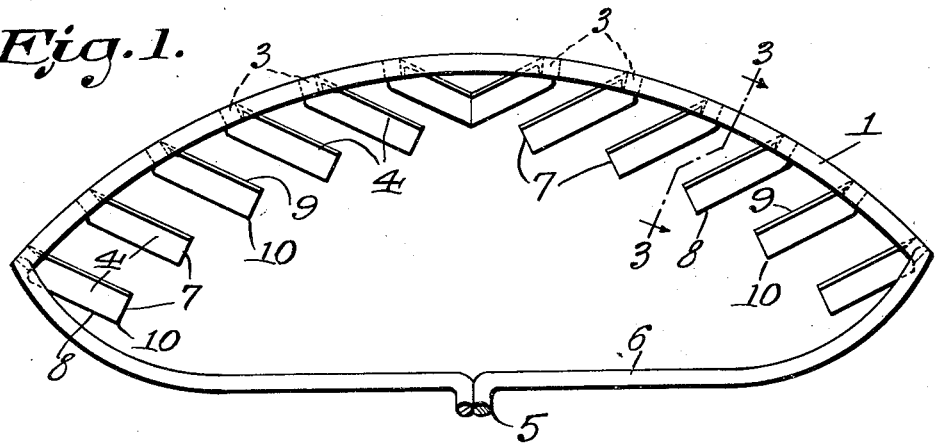
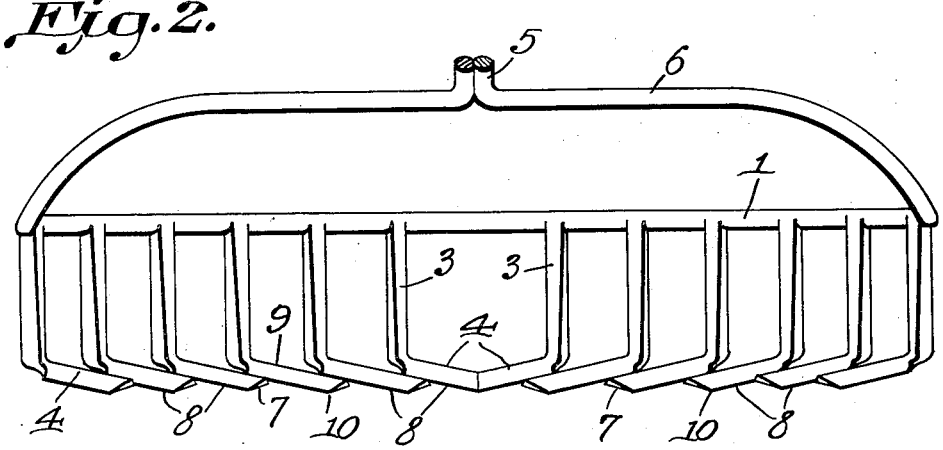
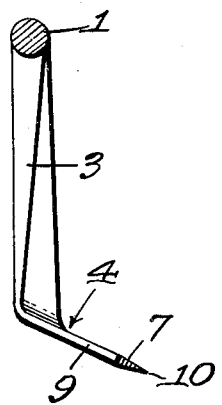
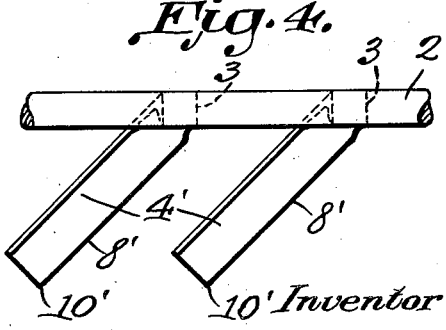
Inventor
A. W. Zimmermann
By C. A. Snow & Co.
Attorneys.

Patented Sept. 4, 1934

1,972,727

UNITED STATES PATENT OFFICE 1,972,727

CULTIVATING TOOL

Alexander W. Zimmermann, Arcadia, Fla., assignor of forty-five one-hundredths to John F. Richards and ten one-hundredths to Leonard O. Stephens, both of Arcadia, Fla.

Application March 2, 1933, Serial No. 659,375

1 Claim. (Cl. 97—63)

This invention relates to a tool which, while capable of use as a rake, is more especially designed for cultivating gardens.

It is an object of the invention to provide a rake-like tool the teeth of which are formed at their lower ends with obliquely disposed cutting blades so positioned that when the tool is pulled toward the user, the blades can be used to cut close to but under the surface of the ground so as to sever the roots of weeds and grass.

A further object is to provide blades of this character which are spaced apart so that the loosened material can pass freely between them.

A still further object is to arrange the blades so as to produce a substantially continuous cut from one side of the tool to the other without requiring the use of abutting, alining blades or a single blade as heretofore.

Another object is to provide blades having angular ends which advance points first, thereby causing the tool to plow into the soil more readily than would otherwise be possible.

Another object is to arrange the blades in opposed series, each series being arranged at an angle opposite to that of the opposed series so that the resistance encountered by the two groups of blades while in use will be substantially equalized, thereby eliminating side draft so that the tool can easily be pulled in a desired direction.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing:

Figure 1 is a plan view of the tool, the handle being removed.

Figure 2 is a front elevation.

Figure 3 is an enlarged section on line 3—3, Figure 1.

Figure 4 is an enlarged plan view of a portion of a modified structure.

Referring to the figures by characters of reference 1 designates the top bar of the head of the tool. As shown in Figure 1 this bar is arcuate or bowed but, if desired, a straight bar 2 can be used as shown in Figure 4.

In either case teeth 3 are extended downwardly from the bar in the same manner as ordinary rake teeth. These teeth differ from rake teeth, however, in that the lower end of each tooth merges into an obliquely disposed blade 4 which is extended in the same general direction as the handle of the tool a portion of which has been indicated at 5 where it is joined to the bar by a yoke 6. Each blade has its forward or free end 7 at right angles to its front or cutting edge 8. Each blade gradually increases in thickness toward its rear or thick edge 9. The end 7 and edge 8 of each blade cooperate to form a point 10 so located that when the tool is pulled toward the user this point will plow into the soil while the edge 8 will tend to cut through the soil close to the surface thereof.

The several blades 4 are arranged in two oppositely disposed series, each series extending from one end of the bar 1 to a point adjacent to the center thereof. The cutting edges of the blades in one series are arranged along lines which diverge rearwardly from the corresponding lines of the cutting edges of the blades of the other series. The forward end 7 of each blade is supported in front of the next adjoining blade except at the center of the tool where it is preferred to have two opposed blades come close together.

The blades are all inclined relative to their teeth 3 as shown particularly in Figure 3 so that while the tool is in use these blades will not lie flat upon the surface of the soil but will be tilted relative thereto with the points 10 lowermost.

In using the device the same is pulled forwardly or toward the operator in the same manner as an ordinary rake. As the blades 4 are inclined downwardly and forwardly their points 10 will cut into the soil. The cutting edges 8 diverge rearwardly toward the two sides of the tool and as they cut into the soil the side draft which ordinarily would be produced by one blade will be offset by the side draft produced by the corresponding blade at the opposite side of the tool. Thus there will be no tendency to swing laterally while in use. On the contrary the two sets of blades will cooperate to hold the tool to the correct path of movement.

As the blades do not come together at the sides but are spaced apart, the loosened material can pass between them readily. Furthermore, as the blades are disposed in lapped relation they will produce, in effect, a continuous or unbroken cut throughout the width of the tool.

In the modified structure illustrated in Figure 4 the blades have been illustrated at 4', their points at 10' and their cutting edges at 8'. These blades when assembled in opposed series diverging rearwardly, will act in the same manner as the blades shown in Figure 1.

It is to be understood that other modifications of the tool can be used within the scope of the appended claim.

What is claimed is:

A tool for skinning the top surface of the soil, including a bar for connection to a handle, a single row of teeth extending downwardly from the bar along a line extending transversely of the tool, an obliquely disposed blade extending forwardly from the lower end of each tooth, the blades at one side of the center of the bar being parallel and converging forwardly toward the blades at the other side of the center of the bar which are also parallel, the two blades nearest the center of the bar being in contact at their forward ends to provide a point, every one of the blades being provided with a forward longitudinally cutting edge terminating at its forward end in a point, all of the blades being inclined downwardly and forwardly toward their cutting edges and each blade being extended a substantial distance into the path of the next adjoining blade.

ALEXANDER W. ZIMMERMANN.